United States Patent [19]
Lerner

[11] Patent Number: 5,864,864
[45] Date of Patent: *Jan. 26, 1999

[54] METHOD AND APPARATUS FOR PROVIDING TRANSPARENT PERSISTENT DATA SUPPORT TO FOREIGN DATA TYPES

[75] Inventor: Benjamin Lerner, Palo Alto, Calif.

[73] Assignee: Sun Microsystems, Inc., Mountain View, Calif.

[21] Appl. No.: 534,573

[22] Filed: Sep. 27, 1995

[*] Notice: This patent issued on a continued prosecution application filed under 37 CFR 1.53(d), and is subject to the twenty year patent term provisions of 35 U.S.C. 154(a)(2).

[51] Int. Cl.$^6$ .................................................. G06F 17/00
[52] U.S. Cl. .............................. 707/102; 707/100; 707/2; 707/10
[58] Field of Search .................................. 395/601–684; 707/1–10, 100–102, 200–206

[56] References Cited

U.S. PATENT DOCUMENTS

| | | | |
|---|---|---|---|
| 5,008,786 | 4/1991 | Thatte | 364/200 |
| 5,206,951 | 4/1993 | Khoyi et al. | 395/650 |
| 5,437,027 | 7/1995 | Bannon et al. | 395/600 |
| 5,504,895 | 4/1996 | Kurosawa et al. | 395/650 |

FOREIGN PATENT DOCUMENTS

WO95/00907  5/1995  WIPO .............................. G06F 12/00

OTHER PUBLICATIONS

William Harrison, Harold Ossher, "Attaching Variables to Method Realizations Instead of Classes." IEEE, 0–8186–2585–Jun. 1992, pp. 291–299.

J. Eliot Moss, "Working with Persistent Objects: To Swizzle or Not to Swizzle", IEEE Transactions On Software Engineering, vol. 18, No. 8, Aug., 1992.

Francois Bancilhon, http://www.sigs.com/publications/docs/oc/9602/oc9602.c.bancilhon.html.

Massimo Ancona, "Persistent Heaps", Mar. 21–23 1990, Proceedings of the Annual International Phoenix Conference on Computers and Communications.

(List continued on next page.)

*Primary Examiner*—Wayne Amsbury
*Assistant Examiner*—David Yiuk Jung
*Attorney, Agent, or Firm*—Beyer & Weaver, LLP

[57] ABSTRACT

The present invention teaches a variety of methods, data structures, and apparatus. In a first embodiment of the present invention, an instance of a data type has a data structure including a transient value data field for storing an internalized data format representation of a persistent data associated with the instance and a persistent value data field for storing an externalized data format representation of the persistent data associated with the instance. The data structure provides a capability of maintaining a persistent data associated with the instance within a database in which the data type of the instance is foreign. This includes embodiments in which the database is a relational database or an object oriented database. In some embodiments, the instance is included in a persistent programming language object. A separate embodiment of the present invention teaches a computer system having a central processing unit, a transient computer readable medium accessible by the central processing unit, a persistent computer readable medium accessible by the central processing unit, and an instance of a data type having a data structure stored in the transient computer readable medium. Further implemented on the computer system is a database and a persistent storage manager. The persistent storage manager is operative to manage the database such that the persistent data associated with the instance is maintained within the database. In addition, a number of methods for providing a variety of aspects of transparent persistent data support to instances of persistent foreign data types are disclosed.

34 Claims, 11 Drawing Sheets

OTHER PUBLICATIONS

Millard et al., "Run–Time Support and Storage Management for Memory–Mapped Persistent Objects", May 25–28 1993, Proceedings of The 15th International Conference on Distributed Computing Systems.

Morrison et al., "Exploiting Persistent Linkage in Software Engineering Environments", Jan. 1995, The Computer Journal, vol. 38, No. 1.

J. Eliot B. Moss, "Working with Persistent Objects: To Swizzle or Not to Swizzle", Aug. 1992, IEEE Transactions on Software Engineering, vol. 18, No. 8.

Marc Shapiro, "A Binding Protocol for Distributed Shared Objects", Jun. 21–24 1994, Proceedings of the International Conference on Distributed Computing Systems.

METHOD AND APPARATUS FOR PROVIDING TRANSPARENT PERSISTENT DATA SUPPORT TO FOREIGN DATA TYPES

BACKGROUND OF THE INENTION

The present invention relates to the fields of databases, object oriented databases, distributed computing systems, and object-oriented programming. More specifically, the present invention teaches methods, data structures, and apparatus for providing transparent persistent data support to data types which are foreign to a database or other persistent storage mechanism.

While the teachings of the present invention are suitable for a variety of computing environments, the background and detailed description of the invention present a number of specific examples drawn from a couple of different computing environments. Because of its capabilities and current popularity, the class of object oriented computing environments is particularly highlighted and in fact a number of embodiments of the present invention are well suited for use therein. However, the examples provided in both the background and the detailed description are intended to draw forth and clarify details of the present invention and should in no way be construed as limiting.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and/or procedures of the object are relatively isolated from the remainder of the program. This provides code that is more easily maintained as compared to code written using traditional methods, as changes to an object's code do not affect the code in the other objects. In addition, the inherent modular nature of objects allows individual objects and interfaces to be reused in different programs. Thus, programmers can develop libraries of "tried and true" objects and interfaces that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language (IDL) that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Elaborating further on the distributed object operating environment, distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service.

From the perspective of the distributed object life cycle, objects fall into one of two categories: transient or persistent. When discussing the transient or persistent nature of an object, what is being referred to is the transient or persistent nature of the object's state. As will be well familiar to those skilled in the art of object oriented programming (OOP), an object may be described by two components: executable code and state. Executable code is essentially the instructions by which the object operates; it defines the "behavior" of the object. State is simply the remaining portion of the object such as data which is not code. In further explanation, the nature of the state which an object will maintain is defined through the variables defined by the object developer. More specifically, these variables will be of a predetermined data type, as will be discussed below.

Much of the prior art teaching is directed towards transient objects. Transient objects typically have a short life span and are bound to a single host computer process. That is, when a host computer process ceases, all transient objects residing in the host computer process cease. Therefore there is no continuity of identity of a transient object from one process to another. Because transient objects are bound to a single process, they inherently cannot change their location. Hence transient objects could also be referred to as "immobile" objects, as their addresses may never change. A programmer whose object kinds include only transient objects is limited in preserving the object state from instance to instance.

In contrast, persistent objects are not bound to a single process and their address and memory location may change over time (e.g., they may have many "life" cycles). With a persistent object, there is a continuity of identity from one process to another. In brief, persistent objects are objects whose state (i.e. the variables of persistent data type) can outlive the life of a specific instance of the object. As will be appreciated, persistent objects may provide many advantages to the object developer. Unfortunately, prior strategies for implementing persistent objects fall short of providing a satisfactory solution to the object developer, as will be described below.

In what is perhaps the crudest strategy for providing persistent objects, the programmer codes within the object the reading and writing (i.e., the management) of data from a permanent storage medium such as a hard disk drive. While this strategy may work for simple scenarios, there are at least two defects. First, the object developer bears the burden for implementing this data management into each persistent object. Second, this strategy has unnecessary overhead. By way of example, each object must include the previously mentioned code for persistent data support. Furthermore, the structure of the data file may become quite intricate, demanding elaborate parsing just to read and write data. All of this data management must be done at execution time by the object, resulting in an expensive solution in terms of system resource utilization.

In another approach for providing persistent objects, persistence has been introduced into existing object programming languages. In one approach, an extension to the existing programming language provides an interface to the functionality of a database. For example, a compiler for an extended language using this approach might accept a specialized set of commands geared for use with a database. The most common type of database used with these methods is a relational database. As relational databases were not designed for storing many of the data types in which object state is typically found, this approach may introduce its own set of dilemmas. Object oriented databases are available, but objects created through object oriented databases are also limited by the data types available within the object oriented database. In any event, each of the prior art strategies places an undue burden on the programmer as they must still consciously manage the object data persistence.

FIG. 1 illustrates one possible flow 100 of the creation of a persistent programming language object in accordance with prior art, the prior art limited to data types understood by the object oriented database utilized. As will be appreciated by those skilled in the art, an object developer will generate a variety of files including two distinct components which are: an object oriented (OO) program 101; and an OO schema definition 102. The OO program 101 is coded in a standard OO language such as C++ and defines the behavior and attributes of the object being developed. The OO schema definition 102 is coded in a data definition language (DDL) and defines and describes all the object variable structures and the natures thereof. OO schema definition 102 thus includes variable declarations defining variable names and data types, as well as an indication of which variables require persistence as provided by the object oriented database (OODB).

The creation flow 100 is as follows. 00 schema definition 102 is processed by the OODB schema tool 104 to generate the OODB schema 106 and the local headers 108. Essentially, the local headers 108 are the data classes available within the object. As will be appreciated, an object "class" is a template from which an object can be created. It is used to specify the behavior and attributes (e.g. persistent) available to all objects of the class. The OODB is the schema utilized by the OODB to help provide persistence.

The local headers 108 are, figuratively, merged together with the OO program 101 and the product compiled by the OO compiler 114. In turn, the product of the 00 compiler 114 is linked together with standard libraries 118 by an OO linker 115 to generate the OO binary 116. As will be appreciated, the OO binary 116 is executable code from which object instances are generated. Finally, the OODB engine 110 utilizes the OODB schema 106 together with a particular object instance to generate a database which maintains persistent data in a persistent storage medium 120. Thus the types of data which can be maintained persistently are directly limited, on the one hand by the DDL and on the other hand by the capabilities of the OODB.

For any given data definition language (such as CORBA's DDL), a certain number of data types will be defined. As will be appreciated, the data types define the structural characteristics, features, and properties of data that may be directly specified by the software developer. In an object oriented computing environment, the given DDL will likely include the standard, well known, OOP data types. Examples of these include LONG INTEGER, SHORT INTEGER, FLOATING POINT, CHARACTER STRING, ARRAY, and STRUCTURE. Additionally, the given DDL will include data types which are specific to the particular object operating environment. For example, OMG's DDL includes the data types OBJECT REFERENCE, ANY, TYPE CODE, and PRINCIPLE.

While much of the preceding discussion has focused on object oriented computing environments, many of the same dilemmas arise within other computing environments. In general, when a computing environment provides a persistent storage mechanism of the prior art (e.g. a relational database or an object oriented database), the prior art persistent storage mechanism only provides persistent storage to known data types. Thus persistence is not provided to "foreign data types" which are not known to the persistent storage mechanism.

In order to bring out a further defect of the prior art, attention is now focused on the data type CORBA::ANY. When data which a selected parameter may receive must not be constrained to a particular data type, the object developer defines the selected parameter as a data type ANY. By way of analogy, a data variable of type ANY can be thought of as an envelope (the defined parameter of data type ANY) which can contain a letter (the data whose type is a priori unknown). A distributed object operating environment abiding by CORBA will provide facilities for construction of a type ANY parameter from whatever declared data types subsequent operations require. In essence, the in memory form of a type ANY parameter is composed of a graph of non-contiguous elements linked together by pointers. The CORBA specification does not define any other form visible to the developer.

Based upon the CORBA defined form of the data type ANY, developers are not provided with data type ANY externalize and internalize commands. As will be familiar, such "externalize" commands would convert the data type ANY parameter into a form suitable for operations such as interprocess communication, network transmission, and storage in persistent memory. Conversely, "internalize" commands perform the tasks involved in reforming the data type ANY parameter into an active internal format. Since object developers are not provided with type ANY externalize/internalize commands, they don't have a direct mechanism to perform this conversion. Hence they must write their own externalize/internalize operator commands or, on a case by case basis, open up the type ANY "envelope" to extract data and recreate the type ANY "envelope" to insert data.

Similar dilemmas are encountered with a variety of important data types within a number of computing environments. For example, the well known data type "STRUCT" is a foreign data type within computing environments utilizing relational databases. In general, externalizing and internalizing data types such as OBJECT REFERENCE, ANY, TYPE CODE, PRINCIPLE (each foreign to OODBs and relational databases) and STRUCT (foreign to relational databases) require difficult, time consuming development which software developers should not be concerned with. However, externalizing and internalizing are basic steps in accomplishing any persistent data mechanism and thus, if persistence is desired, these steps cannot be avoided. What are needed are methods, apparatus and data structures to transparently (with respect to the developer) perform the processes of externalizing and internalizing a variety of data types while transparently managing the desired persistence.

SUMMARY OF THE INVENTION

In accordance with the objectives of the present invention, a variety of methods, data structures, and apparatus are disclosed. In a first embodiment of the present invention, an instance of a data type has a data structure including a transient value data field for storing an internalized data format representation of a persistent data associated with the instance and a persistent value data field for storing an externalized data format representation of the persistent data associated with the instance. The data structure provides a capability of maintaining a persistent data associated with the instance within a database in which the data type of the instance is foreign. This includes embodiments in which the database is a relational database or an object oriented database. In some embodiments, the instance is part of a persistent programming language object.

A separate embodiment of the present invention teaches a computer system having a central processing unit, a transient computer readable medium accessible by the central processing unit, a persistent computer readable medium accessible by the central processing unit, and an instance of a data type having a data structure stored in the transient computer readable medium. The data structure has a transient value data field for storing an internalized data format representation of a persistent data associated with the instance and a persistent value data field for storing an externalized data format representation of the persistent data associated with the instance. Further implemented on the computer system is a database and a persistent storage manager. The persistent storage manager is operative to manage the database such that the persistent data associated with the instance is maintained within the database. Thus the persistent storage manager enables instances of data types which are foreign to the database to be maintained therein.

The present invention also teaches a computer system for creating a persistent programming language object having transparent persistent data support. Entities involved in the creation of the persistent programming language object include an object oriented schema tool to compile object oriented schema (including a stored form of a foreign data type) into a data object class, an object oriented compiler to compile an object oriented program together with the data object class into a linkable product, and an object oriented linker to link the linkable product together with standard object oriented libraries and transparent persistence libraries into an object oriented binary file including an instance of the foreign data type. The instance includes a data structure stored in a transient computer readable medium, the data structure having a transient value data field for storing an internalized data format representation of a persistent data associated with the instance, and a persistent value data field for storing an externalized data format representation of the persistent data associated with the instance. To further provide the transparent persistent data support, an object oriented database is implemented on the computer system. However, within the object oriented database, the foreign data type is unknown. The present invention further teaches implementing a transparent persistence mechanism enabling the instance of the foreign data type to be maintained on the object oriented database.

According to one aspect of the present invention, a computer implemented method for creating a persistent instance of a foreign data type capable of receiving transparent persistent data support is disclosed. The creation method includes the step of providing a data structure having a transient value data field for storing an internalized data format representation of a persistent data associated with the instance and a persistent value data field for storing an externalized data format representation of the persistent data associated with the instance. In a related embodiment, an internalized null value is stored in the transient data field and an externalized null value is stored in the persistent data field.

In an insertion method of the present invention, a new value is received which is intended to be inserted into a given instance of a foreign data type. In turn, the new value is assigned to its associated transient value field. Then, an instance identifier associated with the given instance is added to a change list.

According to an extraction method in accordance with yet another aspect of the present invention, when a transient value field associated with a given instance of a data type does not contain a null value, the value stored therein is returned as the result of the requested extraction operation. However, when the transient value field does contain a null value, then a value stored in the persistent value data field is internalized and assigned to the transient value field and is, in turn, returned as the result of the requested extraction operation.

According to a deletion method of a further embodiment of the present invention, when a transient value associated with a given instance does not contain an internalized null value, the current transient value is deleted and the corresponding memory released. Furthermore, when a persistent value associate with the given instance does not contain an externalized null value, the current persistent value is deleted and the corresponding database memory released.

In accordance with another aspect of the present invention, a data commit method (a) creating a given instance of a data type including a data structure having a transient value data field and a persistent value data field, teaches (b) determining whether there are more elements in a change list which need to be committed to a database, the change list capable of representing one or more instances which have data in their corresponding transient value data field intended for the database, (c) if there are more elements in the change list which need to be committed to the database, selecting a next element from the change list, (d) determining whether a transient value data field associated with the selected next element does not contain a null value, and, if it does not, externalizing a current value stored in the transient value data field associated with the selected next element and assigning the externalized value to a persistent value data field associated with the selected next element, (e) writing the externalized value associated with the selected next element into the database, and (f) repeating steps (b)–(e) until there are no further elements in the change list which need to be committed to the database.

BRIEF DESCRIPTION OF THE DRAWINGS

The invention, together with further objectives and advantages thereof, may best be understood by reference to the following description taken in conjunction with the accompanying drawings which are described below.

DETAILED DESCRIPTION OF THE INVENTION

Figure 2:
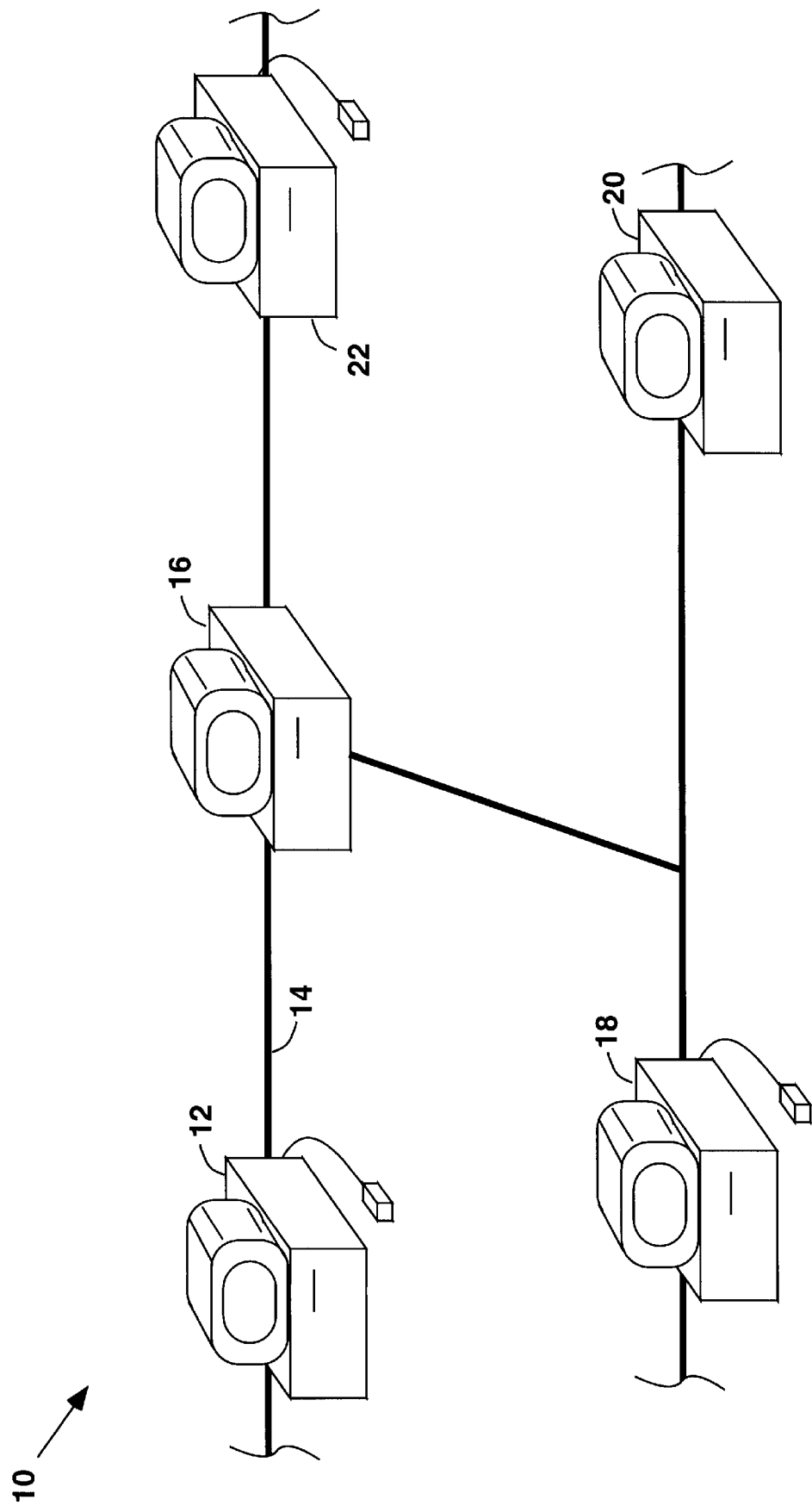
FIG. 2 is a pictorial illustration of various computers linked together in a computer network.

In a preferred embodiment of the present invention, objects and/or distributed objects, variables of standard and/or foreign data types, databases and other persistent storage managers and computer processes are resident on one or more computers linked together by a network. The network may take any suitable form. By way of example, a representative network arrangement 10 is illustrated in FIG. 2. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 3:
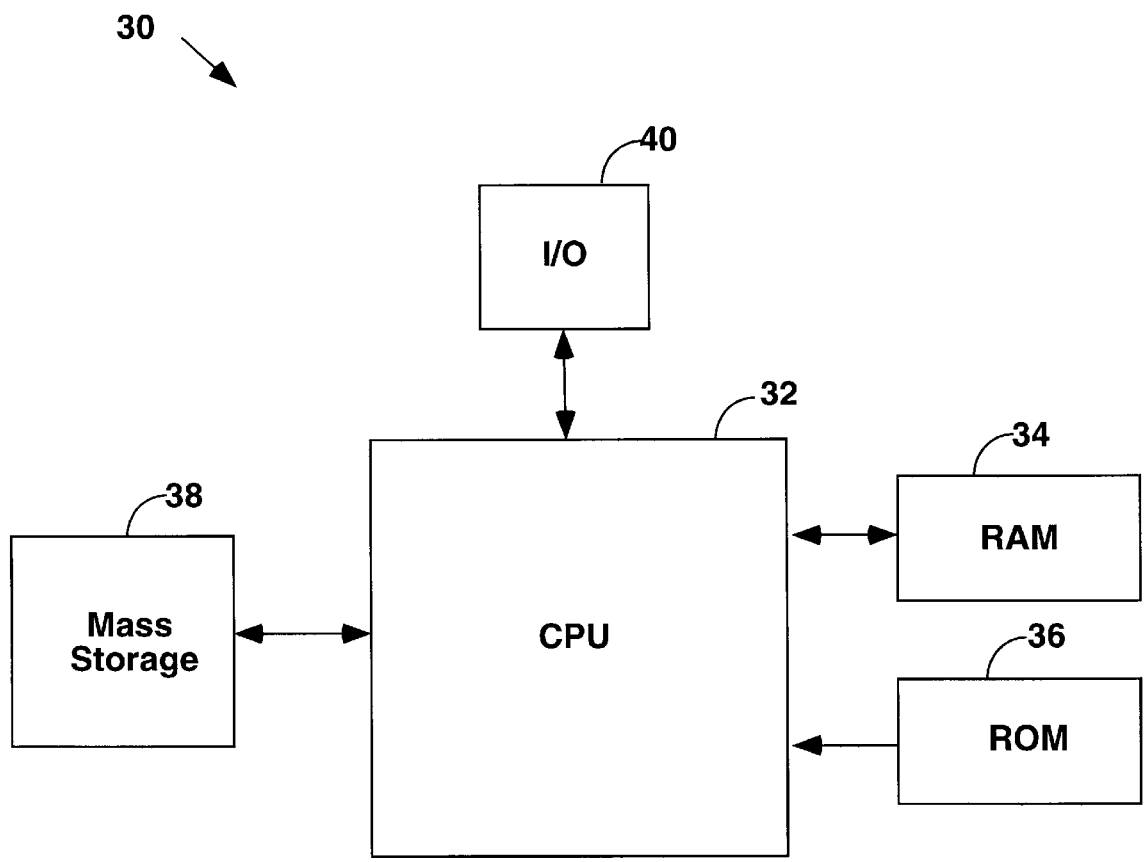
FIG. 3 is a block diagram schematic showing the major components of a computer in FIG. 2.

A representative computer 30 suitable for use as computers 12, 18, 20, and/or 22 of FIG. 2 is illustrated schematically in FIG. 3. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like.

Each of the above described computers optionally includes input/output sources 40 that typically include input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

Figure 4:
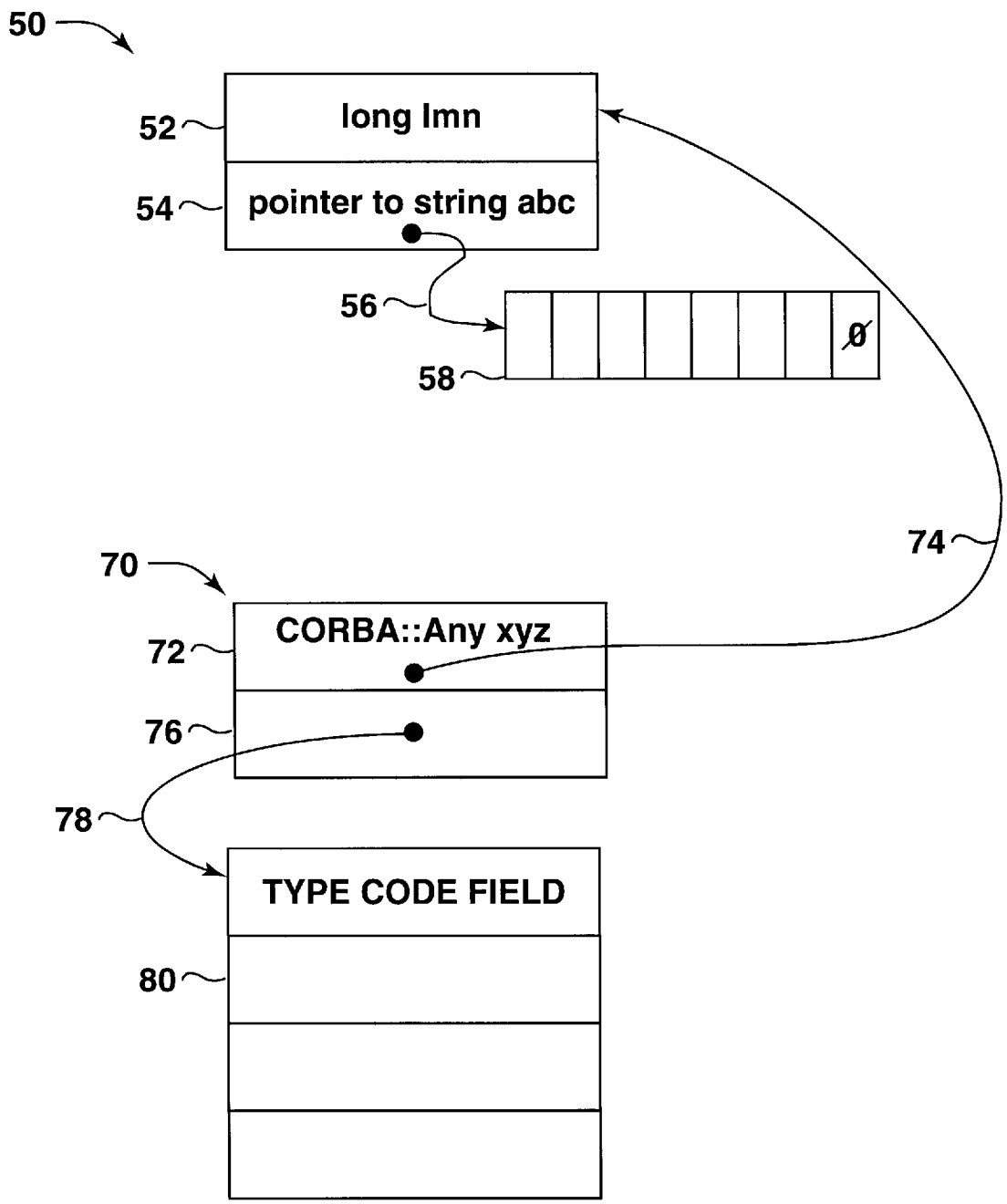
FIG. 4 illustrates diagramatically an in-memory representation of a structure variable having a long integer data type and a string data type, as well as a data type Any and a type code field in accordance with one embodiment of the present invention.

With reference to FIG. 4, in memory representations of a variable 50 of developer defined data type FOO (using the well known data type STRUCT) contained in a corresponding variable xyz 70 of foreign data type CORBA::ANY will be described. In explanation, the following description of a specific foreign data type is provided simply as an example intended to clarify certain aspects of the present invention. Accordingly, the following description should not be interpreted as limiting (explicitly or implicitly) since the teaching of the present invention may be applied to a wide variety of data types.

FOO 50 includes two variables lmn and abc, of data type LONG and STRING respectively. As will be appreciated, the data type FOO 50 is defined in interface definition language (IDL) syntax by the following statements:

```
STRUCT FOO {
    LONG lmn;
    STRING abc;
}
```

In memory, a variable of type FOO 50 has space allocated for a four byte integer field 52 and a first pointer field 54. The integer field 52 is for storing the variable LONG lmn. The pointer field 54 is for a first pointer 56 which indirects to the variable STRING abc which is stored in the byte field 58 which consists of one or more consecutive bytes.

As will be appreciated, in the following sample computer statements which roughly follow C/C++ syntax, a developer declares a variable fgh as data type FOO, declares a variable xyz as data type CORBA::ANY, and then inserts the variable fgh into the variable xyz through an insert operator defined as "<<="; note that the insert operator "<<=" is not defined within CORBA for the case of persistent storage. However, by applying the teachings of the present invention, the operator "<<=" can provide transparent persistent support. The statements are:

FOO fgh;

COBRA:ANY xyz;

xyz <<=fgh;

After these statements have been executed by a computer such as computer 30, the remaining portion of FIG. 3 takes on the following form. The in-memory representation 70 of CORBA::ANY xyz (hereinafter referred to as xyz 70)

includes a first pointer field 72 having a first pointer 74 indirecting to the in-memory representation 50 of the variable FOO fgh. Additionally, xyz 70 includes a second pointer field 76 having a second pointer 78 indirecting to a type code field 80. The type code field 80 will be the CORBA::ANY type representation of the variable FOO fgh. Thus it will include information such as data types, field types, field lengths, array indices, array dimensions, internal structures, internal unions, and any other information needed to fully describe the in-memory representation 50 of variable FOO fgh.

In general, the more complicated the variable stored in the data type, the more complicated the type code field 80 becomes. For more details regarding the characteristics of data types such as CORBA::ANY, please see "CORBA— The Common Object Request Broker Architecture and Specification", Revision 2.0, published by the Object Management Group (OMG), ©1995, which is incorporated herein by reference in its entirety. As shown, the in-memory form of a variable of data type CORBA::ANY is composed of a graph of non-contiguous elements linked together by pointers.

Figure 5:
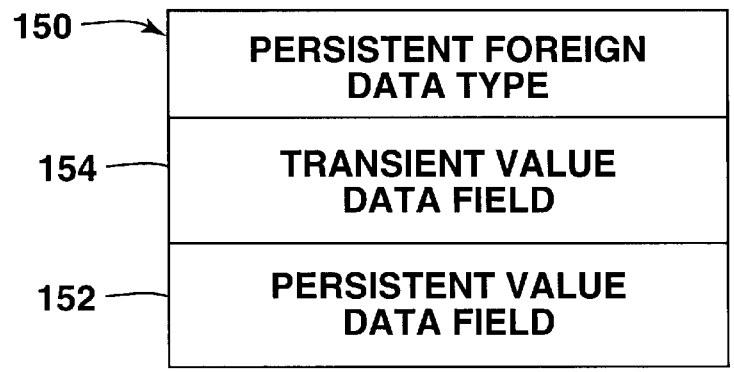
FIG. 5 is a pictorial illustration of an instance of a persistent foreign data type in accordance with another embodiment of the present invention.

With attention focused on FIG. 5, an instance of a persistent foreign data type 150 in accordance with one embodiment of the present invention will now be described. The persistent foreign data type 150 is associated with a given object or variable and includes a persistent value data field p_value 152 and a transient value data field t_value 154. Both p_value 152 and t_value 154 are stored in transient memory (such as RAM 34 or virtual memory allocated in mass storage 38). The p_value 152 is for holding a reference to a persistent form of the instance data (if one exists) resident in a database. Thus the data format of the p_value 152 is externalized and not suitable for active use. In contrast, the t_value is for storing an internalized version of the data references by the p_value 152 (i.e., the objects persistent data).

According to the present invention, the persistent data storage may be managed by any persistent storage manager. For example, any database can be used in conjunction with the teachings of the present invention. One suitable embodiment of the persistent storage manager is described in Hapner et. al.'s copending U.S. patent application Ser. No. 08/414,119 entitled "METHODS AND APPARATUS FOR MANAGING A DATABASE IN A DISTRIBUTED OBJECT OPERATING ENVIRONMENT" which is incorporated herein by reference in its entirety.

With reference to FIGS. 6–12, a number of methods for providing the different aspects of persistent data support to foreign data types will be described. These methods may be incorporated into any selected operating environment (such as an object oriented operating environment implementation following CORBA) thereby enabling software developers to utilize a variety of persistent foreign data types. In preferred embodiments, the teachings of the present invention are implemented such that the operations appear to be standard operations defined by the selected operating environment. However, the operations performed on the specified data types are in actuality interposed between the developer and the standard operations. In essence, the methods, data structures, and apparatus of the present invention make the complexities of internalizing, externalizing, and persistently storing the foreign data types transparent to the object developer.

Furthermore, the methods of FIGS. 6–12 are well suited for interfacing with a variety of separate databases and associated database managers in order to provide the desired persistence. Since databases are generally well known, in the described embodiments the functions of the database and the operations of its associated database manager are not recited in detail. However, it will be apparent how well known and/or specialized database methods may be incorporated into the methods of the present invention. One suitable database manager is described in Hapner et. al.'s copending U.S. patent application Ser. No. 08/414,119 entitled "METHODS AND APPARATUS FOR MANAGING A DATABASE IN A DISTRIBUTED OBJECT OPERATING ENVIRONMENT."

While it should not be construed as limiting, within the following descriptions of FIGS. 6–12 a number of concrete examples are provided. Therefore, it should be appreciated that the teachings of the present invention are applicable to any data type. In particular, it is believed that the teachings of the present invention are especially useful for managing data types having different internal and external data formats.

Figure 6:
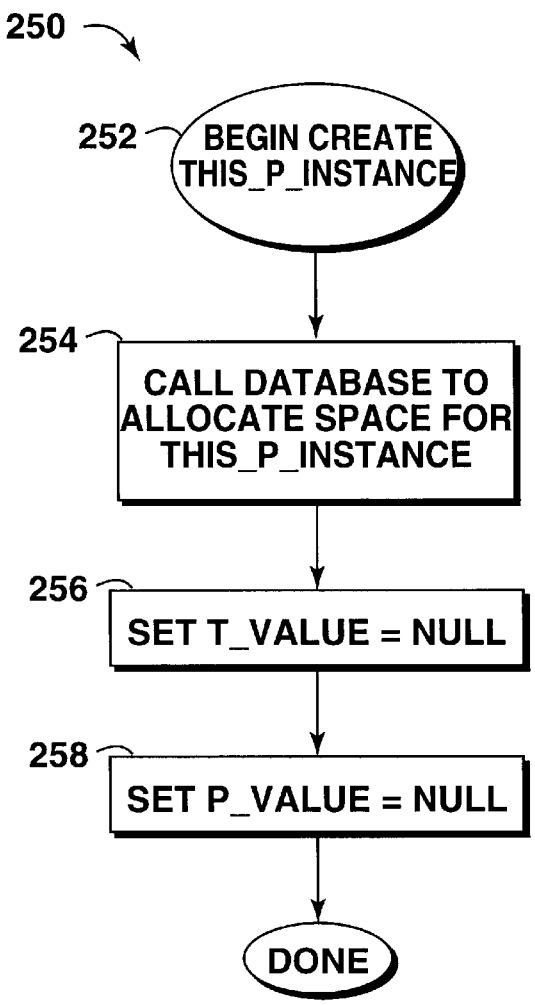
FIG. 6 is a flow chart illustrating an instance creation method for providing transparent persistent data support in accordance with one aspect of the present invention.

Turning to FIG. 6, one creation method 250 for creating an instance this_p_instance 150 of a persistent foreign data type having a persistent value data field p_value 152 and a transient value data field t_value 154 will be described. Step 252 begins the creation of this_p_instance 150. Step 252 may be initiated in response to an object constructor creating a new instance of an object containing this_p_instance 150 or some other suitable invocation. A next step 254 will call a database manager to allocate memory space in a database for this_p_instance 150. In allocating memory space, the database may set aside a fixed amount, a portion of which may not be utilized, or a variable amount which the database manager can expand and contract as needed. As will be appreciated, the database will typically only allocate space for the persistent portion associated with this_p_instance 150.

Next, a step 256 sets the t_value 154 equal to null. As will be well familiar to those skilled in the art, the "null" value is predefined by the underlying computer operating environment. For example, in some operating environments setting t_value 154 to a predefined value (typically all zeroes) indicates that the t_value 154 is null. In contrast, some operating environments have a separate flag associated with each variable (in this case, with t_value 154) and the value of the flag indicates whether the value within t_value 154 is meaningful (non-null). Regardless, the null value placed in t_value 154 should adhere to the internalized data format.

Then, a step 258 sets the p_value 152 equal to null. In contrast to step 256, the null value placed in p_value 152 should follow the externalized data format. Of course, initialization steps 256 and 258 could be performed in reverse order. Additionally, in some embodiments, t_value 154 and/or p_value 152 may not be initialized at all, leaving the burden on the software developer to set these parameters to a meaningful initial value. In accordance with preferred embodiments of the present invention, the method (initializing or not initializing t_value 154 and p_value 152) which is akin to standard operations of the underlying operating environment being enhanced by the methods of the present invention should be utilized. In any event, following step 258, the instance creation method 250 is complete.

Figure 7:
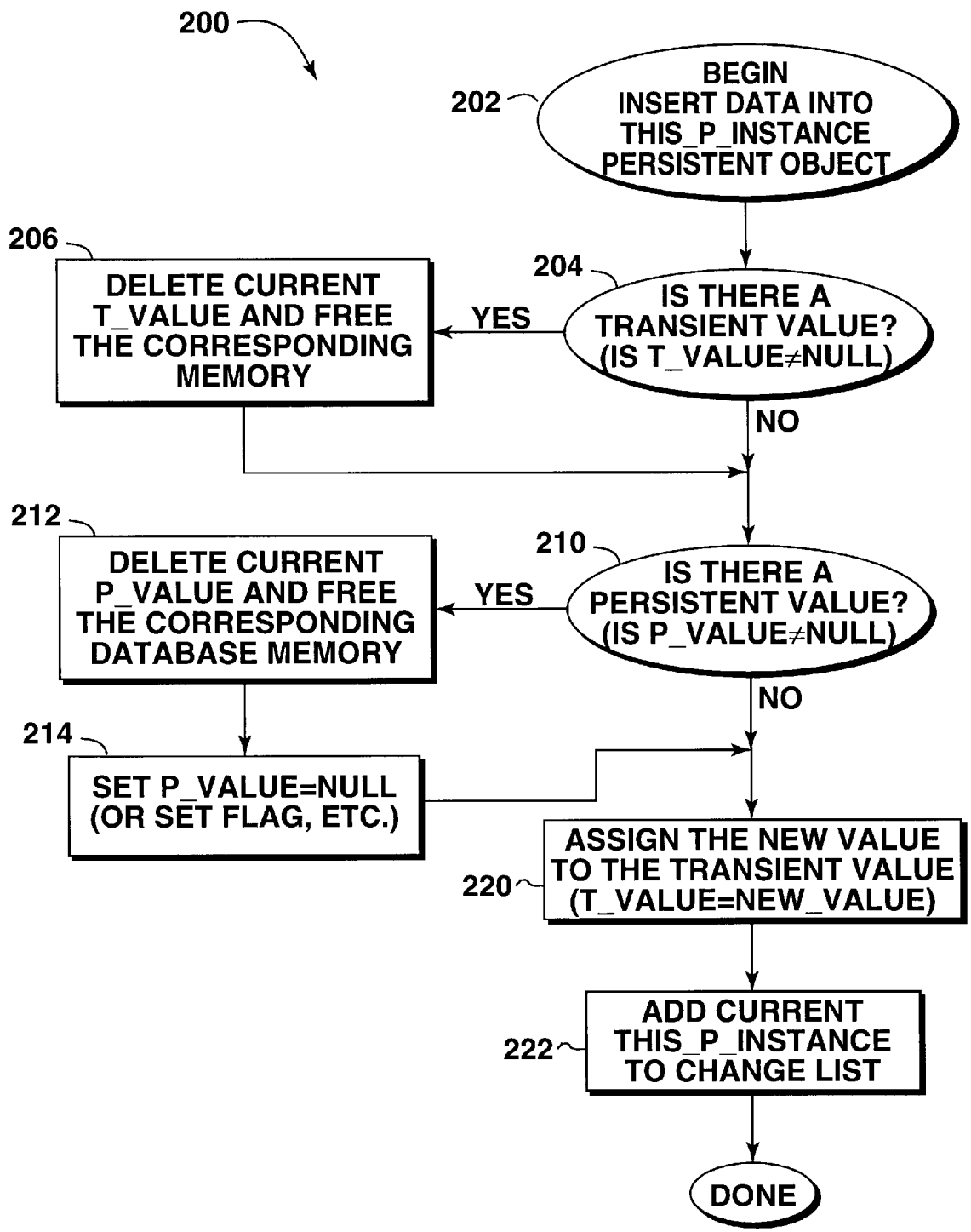
FIG. 7 is a flow chart illustrating a data insertion method for providing transparent persistent data support in accordance with another aspect of the present invention.

Now turning to FIG. 7, one insertion method 200 for inserting data into an instance of a persistent foreign data type in accordance with one aspect of the present invention is described. A step 202 begins the insertion method 200. For the purposes of discussion, label the data which is to be inserted into this_p_instance 150 as "new_value." Note that a variety of operations may invoke method 200. For example, the CORBA C/C++ insertion operator "<<=" described with reference to FIG. 4 may invoke the insertion method 200. In any event, a next step 204 determines if there is a transient value already present in this_p_instance 150. When the embodiments shown in the Figs. are utilized, step 204 can be accomplished by determining whether the t_value 154 is not equal to a null value. When t_value 154 is not equal to null, the method 200 continues in a step 206 which deletes the current t_value 154 and frees the corresponding memory. Step 206 is performed, in part, because situations occur wherein the new_value to be inserted into t_value 154 may utilize a different amount of memory space; it is thus good programming practice to free the corresponding memory.

Following step 206 if there is a transient value, or following the NO branch of step 204 if there is none, a step 210 determines if there is a persistent value. Similar to step 204, if initialization step 258 of FIG. 6 (or some other similar step) was performed, then step 206 can be accomplished by determining whether the p_value 152 is not equal to a null value. If p_value 152 is not equal to null, then the method 200 continues in a step 212 which deletes the current p_value 152 and frees the corresponding memory within the database. Step 212 is performed, in part, for the reasons discussed above with reference to step 206. After the p_value 152 has been deleted and the memory freed, a step 214 sets the p_value 152 equal to null. In other embodiments, a flag may be set to indicate that the value in p_value 152 is meaningless (i.e. not current).

Following completion of step 214 if there is a persistent value, or following step 210 if there is none, a step 220 assigns the new_value to the transient value t_value 154. Note that the new_value is typically generated from within the objects real time execution and thus is generally of data format internal; therefore it requires no conversion prior to insertion in step 220. However, a similar operator might be a "convert, then assign" operator with an additional conversion substep performed in step 220 prior to assignment. In any event, following the assignment of step 220, a step 222 adds the current this_p_instance 150 to a change list for commitment to a database at a future time.

In explanation, the change list is a collection of persistent data entities requiring commitment to the database. The change list may be implemented in any suitable form such as a linked list, a set, a bag, etc. Additionally, since the change list may have a multiplicity of clients, to maintain consistency it is preferably implemented in conjunction with a synchronization variable. One suitable method for performing step 222 will be described in more detail below with reference to FIG. 10.

Figure 8:
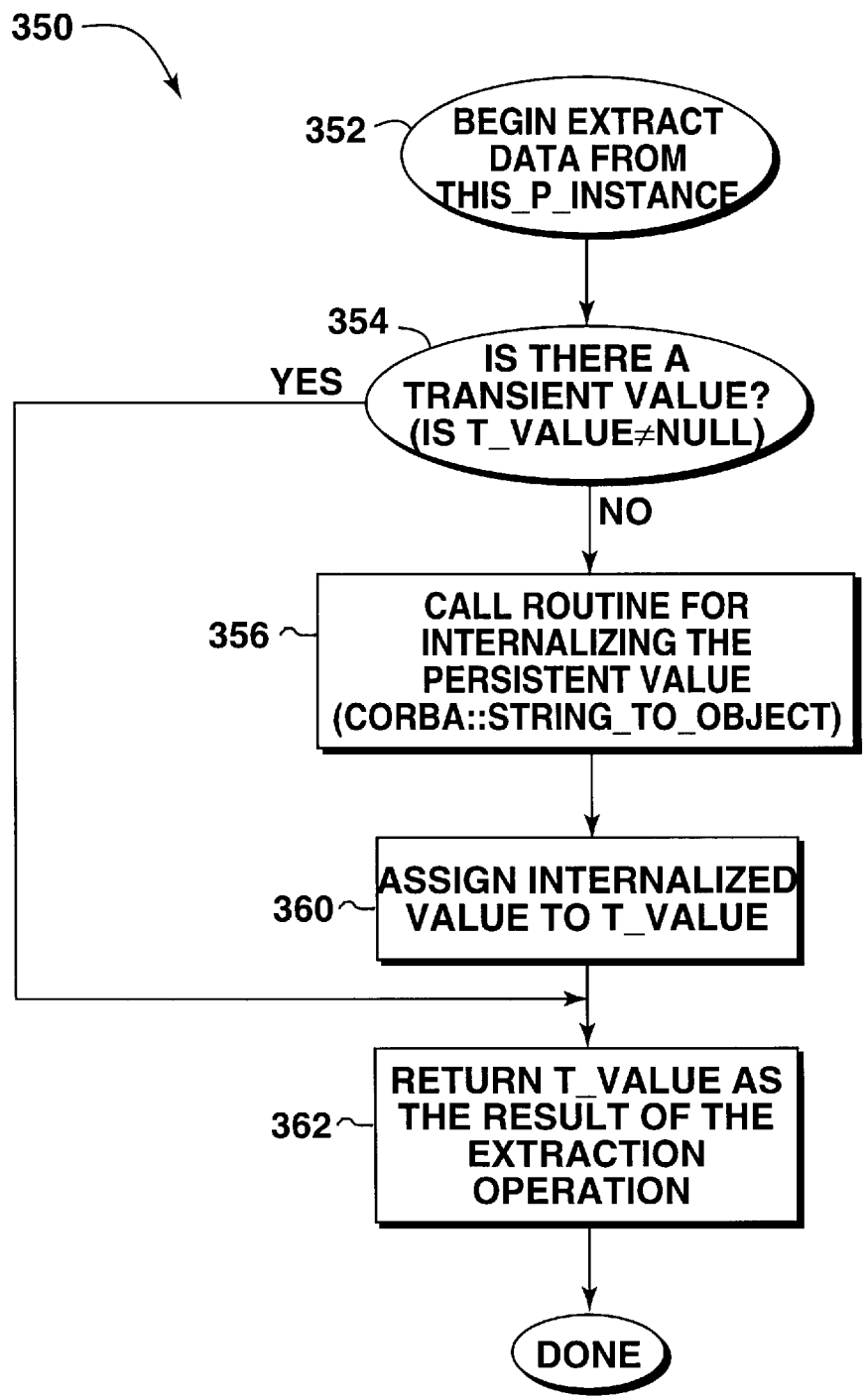
FIG. 8 is a flow chart illustrating a data extraction method for providing transparent persistent data support in accordance with still another aspect of the present invention.

With reference to FIG. 8, an extraction method 350 for extracting data from an instance of a persistent foreign data type this_p_instance 150 in accordance with one embodiment of the present invention will be described. Method 350 begins in a step 352 which would be invoked by any operation which required an internal value for this_p_instance 150. For example, if some operation which was being performed required this_p_instance 150 as a parameter, the extraction method 350 would be invoked.

In any case, a step 354 determines if there is a transient value. Following the embodiments described herein, step 354 may be accomplished by determining if t_value 154 is not equal to a null value. If t_value 154 is not null, then, according to the described embodiments, the value within t_value is an accurate, internalized representation of this_p_instance which is stored in the database. Accordingly, the YES branch of determination step 354 passes control directly to a step 362 wherein the t_value 154 is returned as the result of the extraction operation.

However, if the transient value is not accurate (e.g. t_value is null), then the NO branch of determination step 354 passes control to a step 356 which internalizes the persistent value stored in p_value 152. The internalization step 356 includes reading the persistent data from the database. It is thus an accurate (and current), externalized representation of this_p_instance 150 which is stored in the database. In some cases, implementation of internalizing step 356 may be as straight forward as utilizing CORBA standard operations. For example, the externalized data of objects of data type OBJECT REFERENCE may be internalized by the operation CORBA::string_to_object().

However, in other cases, implementation of internalization step 356 may require a more sophisticated set of operations. For example, CORBA provides no standard for the externalized data of objects of data type ANY. Thus it may be necessary to write a conversion routine for the specific persistent data type. The knowledge necessary to write data format conversion routines such as this depends upon the data type. Nevertheless, provided a specification of the data type, how to implement such data format conversion routines will be apparent to those skilled in the art. Furthermore, the inventive features of the present invention are not directly related to data formatting; therefore, no further details are provided.

Once the persistent value has been internalized, a step 360 assigns the internalized value to the t_value 154. Then, step 362 returns the t_value 154 as the result of the extraction operation.

Figure 9:
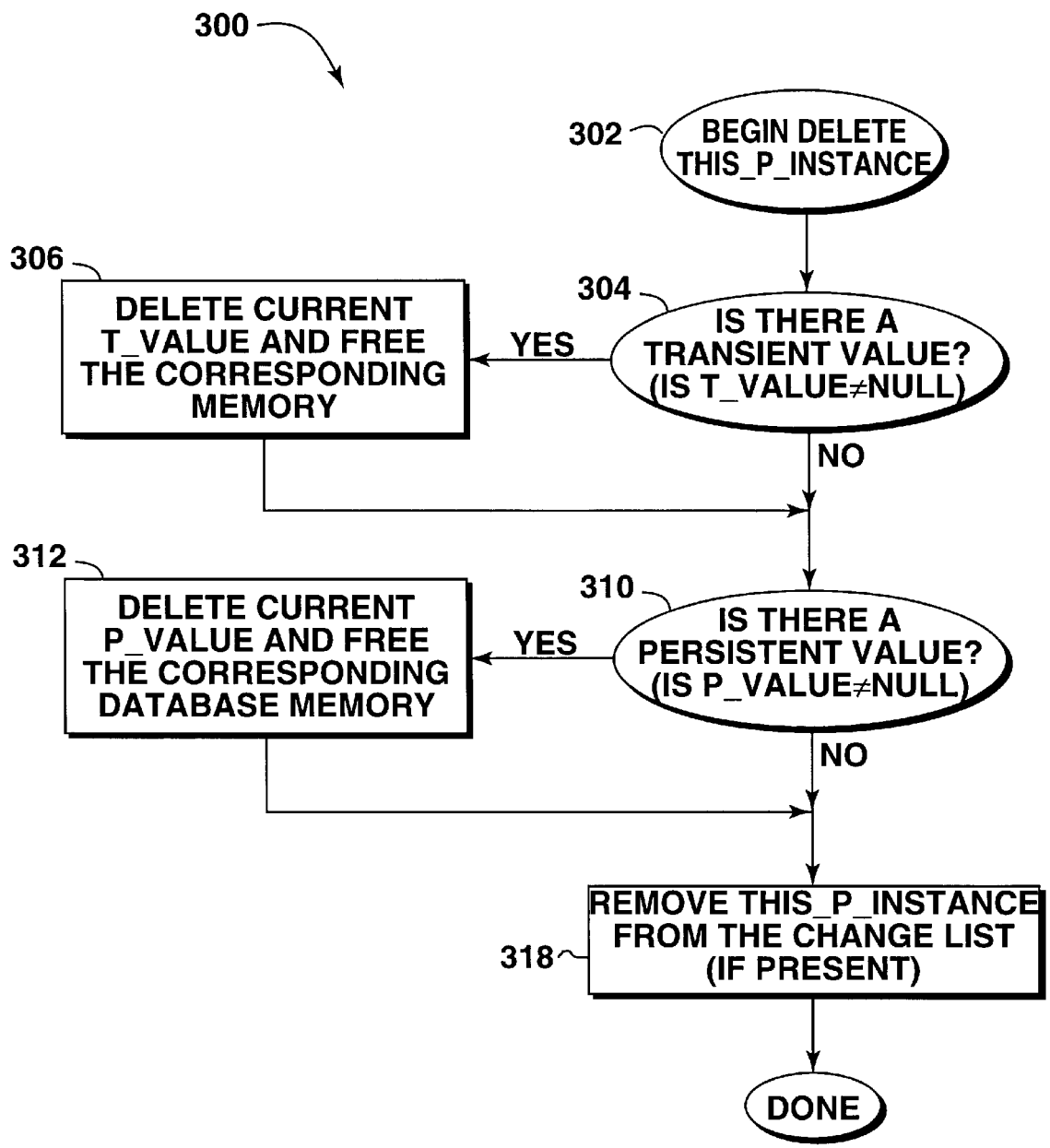
FIG. 9 is a flow chart illustrating an instance deletion method for providing transparent persistent data support in accordance with yet another aspect of the present invention.

Turning next to FIG. 9, a deletion method 300 for deleting an instance this_p_instance 150 of a persistent foreign data type in accordance with one embodiment of the present invention is disclosed. Deletion method 300 begins in a step 302. As will be appreciated, data instances may be deleted by the program for a variety of application specific reasons such as non-activity and replacement.

The method 300 continues in a next step 304 which determines if there is a transient value already present in this_p_instance 150. If the described embodiments or a similar variation are implemented, then step 304 can be accomplished by determining whether the t_value 154 is not equal to a null value. If t_value 154 is not equal to null, then the method 300 continues in a step 306 which deletes the current t_value 154 and frees the corresponding memory.

Following step 306 if there was a transient value, or following the NO branch of step 304 if there is none, a step 310 determines if there is a persistent value. For example, the question "Is the p_value 152 not equal to a null value?" may be posed. If p_value 152 is not equal to null, then the method 300 continues in a step 312 which deletes the current p_value 152 and frees the corresponding memory from within the database.

Subsequent to step 312 or if process control follows the NO branch of step 310, a step 318 removes this_p_instance 150 from the change list, or verifies that this_p_instance 150 is not in the change list. One suitable embodiment for performing step 318 when the change list is associated with a mutual exclusion lock is described below with reference to FIG. 11. Note that removing all indicators of this_p_any 150 from the change list is a robust programming strategy as, subsequent to performing method 300 for this_p_instance, this_p_instance 150 no longer exists to change.

However, other embodiments of deletion method 300 may not include a step such as step 318. In these embodiments, any entity which processes the change list must ignore (or erase) references to objects which do not exist. According to the embodiment of FIG. 9, once the change list is updated in step 318 the deletion method 300 is complete.

Figure 11:
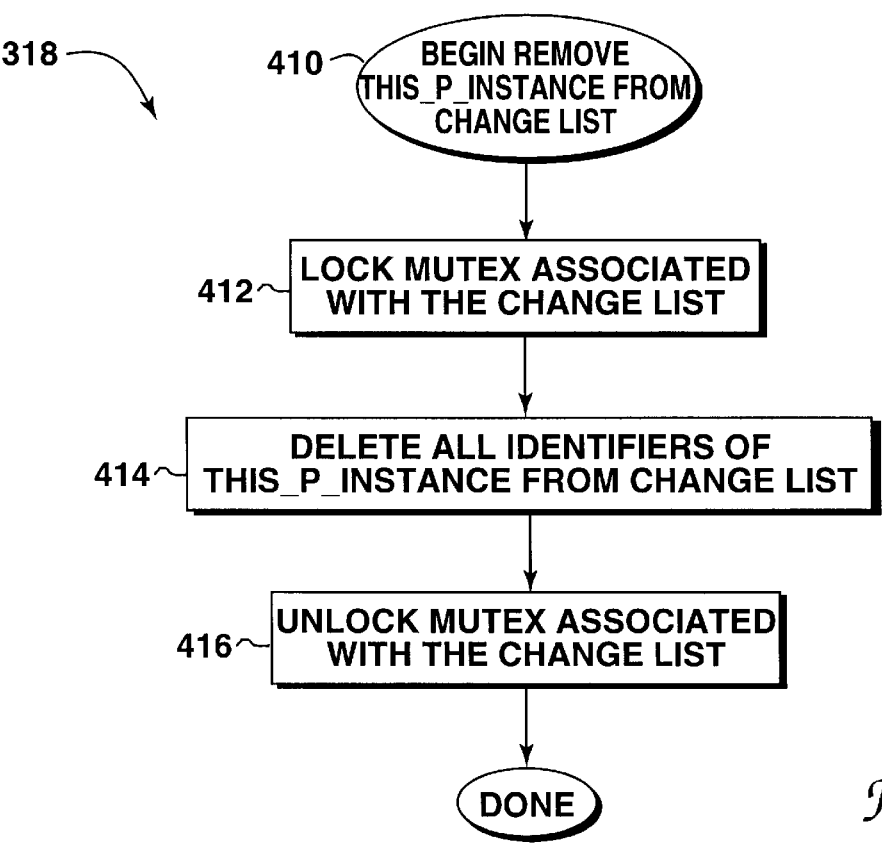
FIG. 11 is a flow chart illustrating one suitable method for performing step 318 of FIG. 9.
Figure 12:
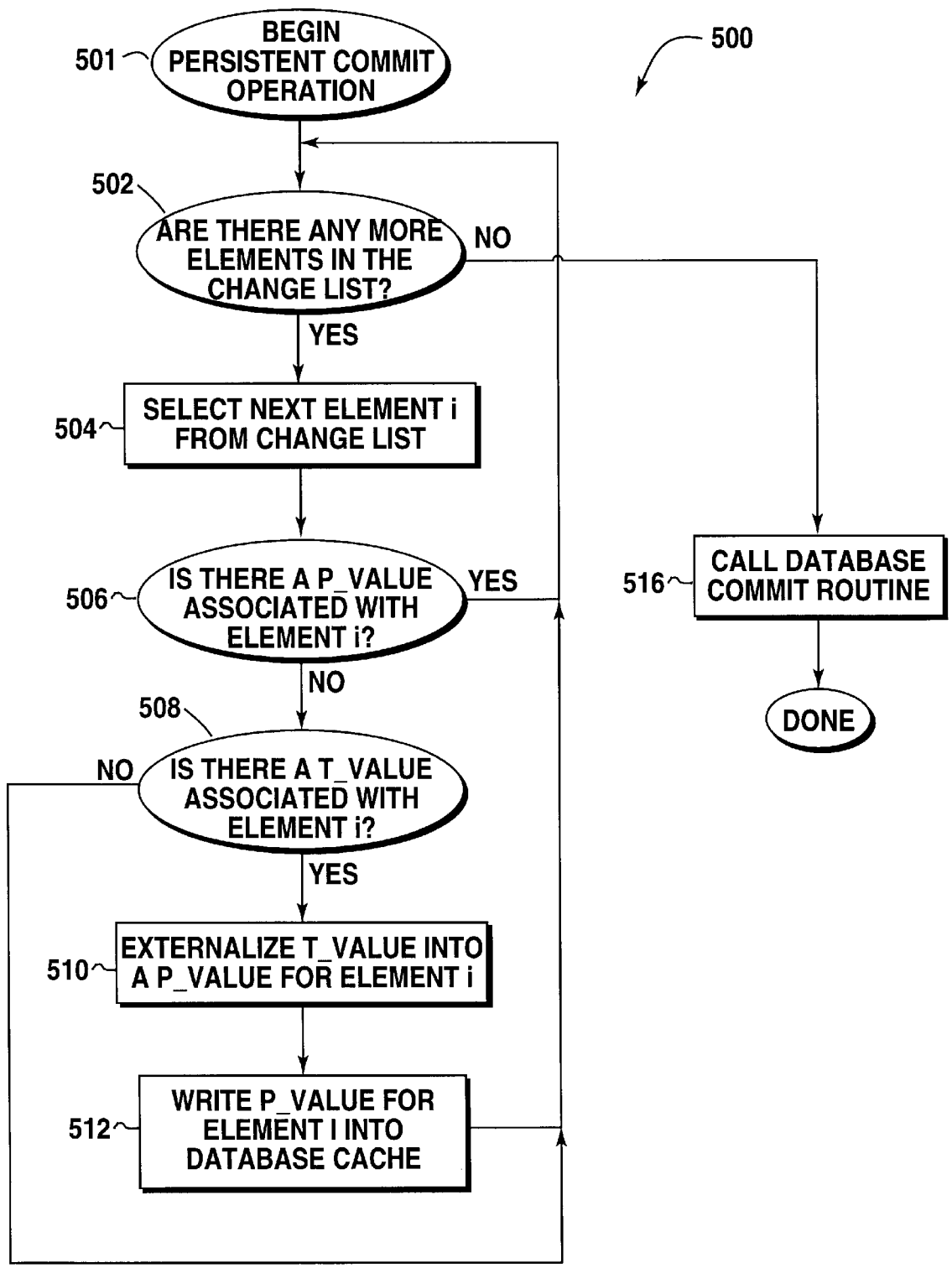
FIG. 12 is a flow chart illustrating a data commit method for providing transparent persistent data support in accordance with a further aspect of the present invention.

With reference to FIGS. 11 and 12, methods insuring consistent utilization of a change list (as required in preferred embodiments of the present invention) will be described. As will be apparent to those skilled in the art, two critical tasks in the implementation of the change list are (1) the serialization of the multiple requests to access the change list and (2) the effective sharing of the change list by the different threads of execution generated by the multiple requests. In essence, a change list must be multi-thread safe when used within a multi-threaded environment.

Synchronization objects, a common tool for synchronizing multithreaded systems, provide variables which may be accessed by multiple processes and/or multiple threads. Thus different threads in a single computer process (or multiple processes) can synchronize in spite of the fact that they are typically unaware of one another's existence. Well known examples of synchronization variables include mutual exclusion locks (referred to hereinafter as mutexes), condition variables, reader/writer locks, and semaphores. Some advantages of using synchronization variables are (1) two or more threads can use a single synchronization variable jointly and (2) synchronization variables insure consistency of the shared data.

In further explanation, a mutex is created to correspond to a piece of code, a portion of data, some state, etc. (In this specific case, a mutex may be generated corresponding to the change list.) When a first thread locks a mutex, all other threads are prevented from executing the piece of code or accessing the portion of state corresponding to the mutex. When a thread has locked a mutex, it is said to "own" the locked mutex. In order for other threads to own the mutex, the first thread (i.e. the thread that locked the mutex) must unlock it. Thus mutexes provide a mechanism by which the developer can control the serialization of multiple threads (potentially created by instances of objects created by different object developers), ensuring that steps occur in a desired order and that the state corresponding to the mutex is maintained in a consistent manner. Synchronization objects are discussed in more depth in the document "Multithreaded Programming Guide", 1994, published by SunSoft, which is incorporated herein by reference in its entirety.

Figure 10:
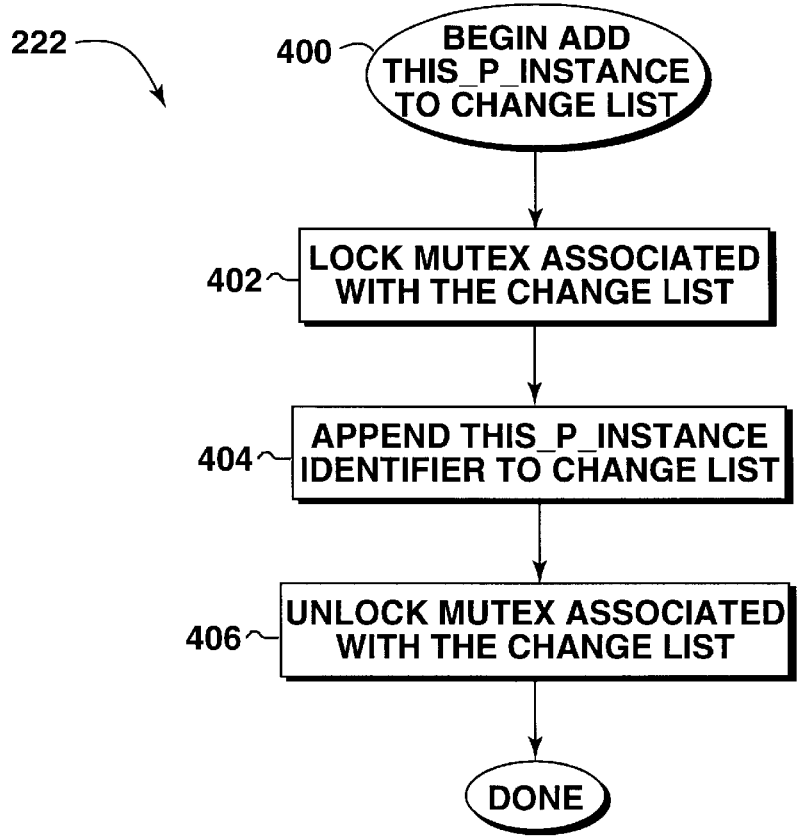
FIG. 10 is a flow chart illustrating one suitable method for performing step 222 of FIG. 7.

Turning directly to FIG. 10, a method suitable for performing step 222 of FIG. 7 in accordance with one aspect of the present invention will be described. In the embodiment of FIG. 10, a mutex is associated with the change list. However, other suitable synchronization objects such as a writer lock may be utilized. The method 222 begins in a step 400 and then a step 402 locks the mutex associated with the change list. Thus, until the mutex is released, only an entity performing this instantiation of method 222 can access the change list. Next, a step 404 appends an appropriate identifier of this_p_instance 150 to the change list. By way of example, the identifier may be a pointer indirecting to the memory space which contains this_p_instance 150.

Note that the described embodiments are not impeded by the change list containing duplicate object identifiers. This implies that duplicate instance identifiers must be dealt with in the other methods, as described below (for example) with reference to FIGS. 11 and 12. Another suitable strategy is to preclude duplicate instance identifiers. That is, in other embodiments of step 404, the identifier for this_p_any 150 is appended to the change list if and only if it is not currently present in the change list. In either case, a next step 406 unlocks the mutex associated with the change list thereby releasing the change list so it may be accessed by other entities. Once the mutex is released, the method of FIG. 10 is done.

Turning now to FIG. 11, a method suitable for performing step 318 of FIG. 9 in accordance with another aspect of the present invention will be described. In the embodiment of FIG. 11, a mutex is associated with the change list. However, another suitable synchronization object such as a writer lock may be utilized. The method 318 begins in a step 410 and then a step 412 locks the mutex associated with the change list. Thus, until the mutex is released, only an entity performing this instantiation of method 318 can access the change list. Next, a step 414 deletes each occurrence of the identifier for this_p_instance 150 in the change list. Thus the method of FIG. 11 must evaluate the entire change list, deleting the identifier for this_p_instance 150 whenever it is encountered. Yet in other embodiments, multiple occurrences of the identifier for this_p_instance 150 are precluded from the change list. Therefore, step 414 may stop after finding and deleting one occurrence (i.e. the only occurrence) of the identifier for this_p_instance 150. In any event, a next step 416 unlocks the mutex associated with the change list thereby releasing the change list so it may be accessed by other entities. After the mutex is released, the method of FIG. 11 is done.

With reference to FIG. 12, a method 500 for performing a persistent commit operation in accordance with one embodiment of the present invention will be described. The persistent commit method 500 begins in a step 501 and may be invoked for a variety of reasons. Some examples include periodic commit, event driven commit, or a forced commit. In the periodic commit, a designated thread of execution maintains a timer, clock, etc. which enables it to periodically invoke/perform the commit method 500. In the event driven commit, a certain event may force the commit method 500 to operate. By way of example, one suitable event is the number of elements present in the change list exceeding a predefined number.

Regardless of how method 500 is invoked, a loop control step 502 determines if there are more elements in the change list which need to be processed. If there are no more elements in the change list, a database commit routine step 516 (which will be discussed later) is performed. In some embodiments, if there are initially no elements in the change list, the database commit routine step 516 is skipped altogether. If there are more elements in the change list to process, a step 504 selects a next element i from the change list in order to process the selected element i. Then, a subsequent step 506 determines if there is a p_value 152 associated with the selected element i. As will be apparent from steps 212 and 214 of FIG. 7 and the subsequent steps of FIG. 12, when there is a p_value 152 associated with element i, an object identifier identical to element i has already been processed and it is unnecessary to further process element i; therefore process control is passed to loop control step 502. Hence duplicate object identifiers are properly handled.

If there is no p_value 152 associated with element i (i.e. p_value is null), then method 500 proceeds in a step 508 where it is determined if there is a t_value 154 for selected element i. If so, method 500 proceeds in a step 510 by externalizing the value in t_value 154 into the p_value 152. In some cases, implementation of externalize data step 510 may utilize CORBA standard operations. For example, the internalized data of objects having data type OBJECT REFERENCE may be externalized by the operation CORBA::object_to_string(). However, in other cases, implementation of internalizing step 510 may require a more sophisticated set of operations. For example, CORBA provides no standard for the externalized data of objects of data type CORBA::ANY. Thus it may be necessary to write a data format conversion routine for some persistent foreign data types. In preferred embodiments, the data format conversion routine is invoked by "standard" operations such that it is transparent to the software developer.

After externalization step 510, a next step 512 writes the p_value for the selected element i into a database. Note that steps 510 and 512 (externalize then write) may suitably be performed as a single step. As will be appreciated by those skilled in the art, the database may maintain a database cache in transient memory. In embodiments such as this, step 512 will write into the database cache and the database manager will attend to transferring the data to persistent storage. Thus the write operation of step 512 may be relatively quick (typically writing to transient memory is faster than writing to persistent memory), but if the computer's power were to fail, the data pending would be lost. In other suitable embodiments, step 512 may write directly into the persistent portion of the database. In either case, after write step 512, control proceeds back again to loop control step 502.

Once all elements in the change list have been processed as described above with reference to steps 504–512, method 500 continues in a step 516 which calls a database commit routine. In preferred embodiments, the database commit routine responds by systematically committing to persistent memory all the changes in the persistent objects. However, other embodiments may provide different strategies for committing to persistent memory the desired changes.

In addition to the steps illustrated in FIG. 12, it may be desirable (at a suitable juncture) to delete all the elements of the change list. For example, immediately following the NO branch of step 502 all the necessary data has been written into the database cache, therefore, for the purposes of some embodiments of the present invention, the change list is no longer relevant and may be deleted. However, in other embodiments, the database manager may utilize the change list within its commit routine. In these embodiments the change list may be deleted by the database manager, or may be deleted by the method 500 once the database manager releases the change list mutex.

Figure 13:
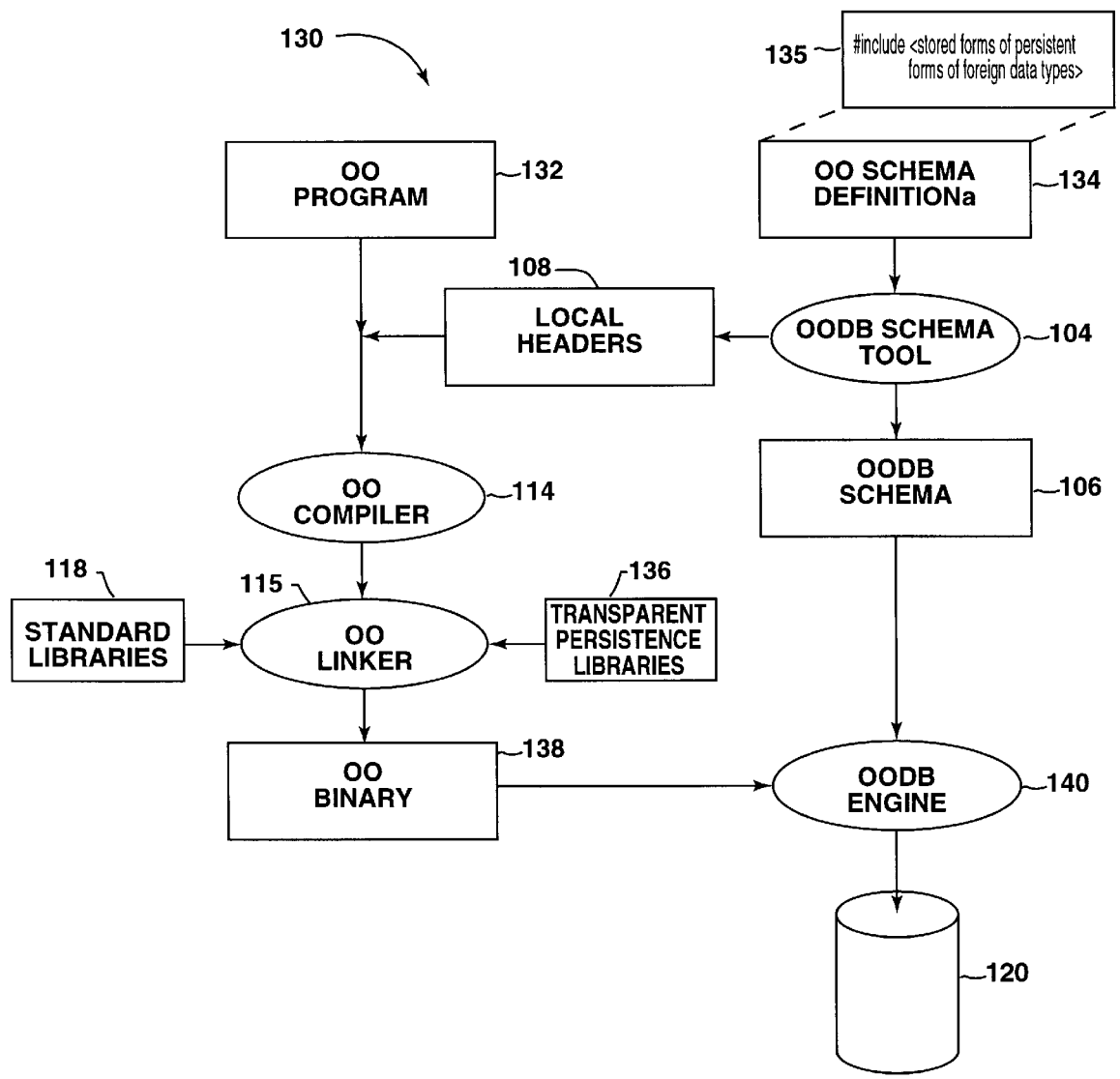
FIG. 13 is a diagrammatic illustration of one paradigm for the compilation of a persistent programming language object having transparent persistent data support in accordance with one embodiment of the present invention.

Turning next to FIG. 13, one example illustrating a creation 130 of a persistent programming language object having transparent persistent data support in accordance with one embodiment of the present invention will be described. Note that FIG. 13 is an embodiment of the present invention which overcomes the shortcomings of the prior art example described previously with reference to FIG. 1.

Figure 1:
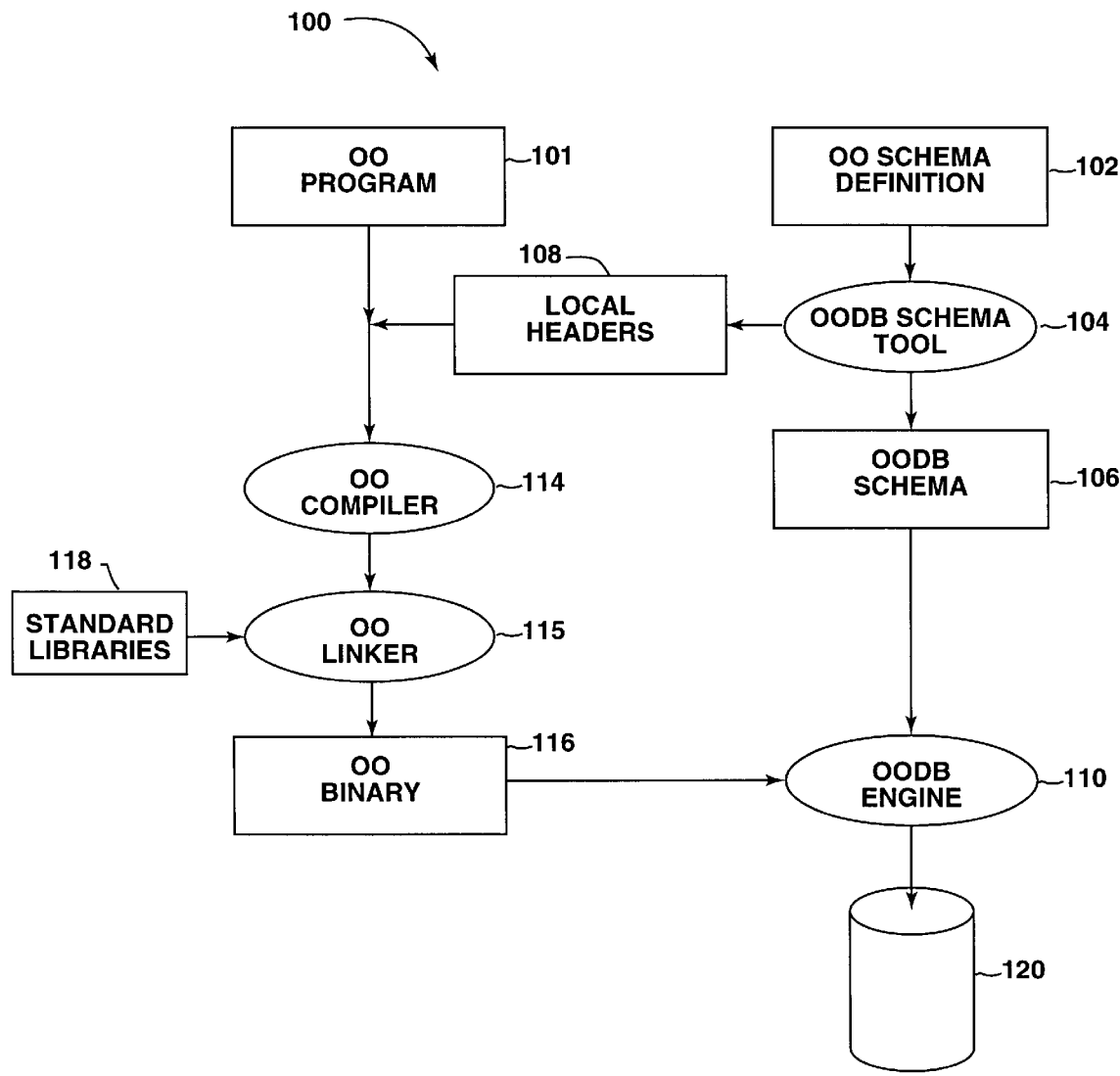
FIG. 1 is a diagrammatic illustration of one possible flow of the creation of a persistent programming language object a s taught by the prior art.

Similar to FIG. 1, an object developer will generate a variety of files including two distinct components which are: an object oriented (OO) program 132; and an OO schema definition 134. The OO program 132 is coded in a standard OO language such as C++ and defines the behavior and attributes of the object being developed. The OO schema definition 134 is coded in a data definition language (DDL) and defines and describes all the object variable structures and the natures thereof. OO schema definition 134 thus includes variable declarations defining variable names and data types, as well as an indication of which variables require persistence as provided by the object oriented database (OODB). However, in contrast to OO schema definition 102 of the prior art, the OO schema definition 134 includes stored forms 135 of the desired persistent foreign data types. Including the stored forms 135 causes required transparent persistence libraries 136 to be linked later during object creation.

The creation flow 130 goes as follows. OO schema definition 134 is processed by the OODB schema tool 104 to generate an OODB schema 106 and the local headers 108. The local headers 108 are then, figuratively, merged together with the OO program 132 and the product compiled by the OO compiler 114. In turn, the product of the OO compiler 114 is linked together with standard libraries 118 and the transparent persistence libraries 136 by an OO linker 115 to generate the OO binary 138, which is the executable code from which object instances are generated.

Finally, the OODB engine 140 utilizes the OODB schema 106 together with an object instance to generate a database which maintains persistent data in a persistent storage medium 120. However, in contrast to the prior art, the methods and data structures of the present invention are incorporated into the computing environment such that the OODB engine 140 can transparently support the persistent foreign data types which were defined within the 00 schema definition 134.

Although only a few embodiments of the present invention have been described, it should be understood that the present invention may be embodied in many other specific forms without departing from the spirit or scope of the invention. Therefore, the present examples are to be considered as illustrative and not restrictive, and the invention is not to be limited to the details given herein, but may be modified within the scope of the appended claims.

I claim:

1. An instance of a data type having a data structure stored in a computer readable medium and arranged for use in maintaining a persistent data associated with the instance, the data structure comprising:

a transient value data field for storing an internalized data format representation of the persistent data associated with the instance, he internalized data format being a format that is arranged for use with data operators provided by a computing environment under which the instance is implemented during a life cycle of the instance; and a persistent value data field for storing an externalized data format representation of the persistent data associated with the instance, the externalized data format being a format that is arranged for surviving the life cycle of the instance, wherein the internalized and externalized data format representations of the persistent data are permitted to be different representations of the same persistent data.

2. An instance as recited in claim 1 wherein the externalized data format representation is arranged for storage in a persistent storage medium.

3. An instance as recited in claim 1 wherein the externalized data format representation is arranged for transmission over a computer network.

4. An instance as recited in claim 1 wherein the instance is implemented under a computing environment including a persistent storage manager which maintains a database in the computer readable medium, the database capable of storing persistent data associated with the instance.

5. An instance as recited in claim 4 wherein the computer readable medium includes a transient memory and a persistent memory, and wherein the data structure is maintained in the transient memory and the persistent data associated with the object is maintained in persistent memory.

6. An instance as recited in claim 4 wherein the persistent storage manager and he database comprise an object oriented database and the data type of the instance is foreign to the object oriented database.

7. An instance as recited in claim 6 wherein the instance is included in a persistent programming language object.

8. An instance as recited in claim 6 wherein the instance is included in a distributed object.

9. An instance as recited in claim 4 wherein the persistent storage manager and the database comprise a relational database and the data type of the instance is foreign to the relational database.

10. A computer system comprising:
   a central processing unit;
   a transient computer readable medium accessible by the central processing unit;
   a persistent computer readable medium accessible by the central processing unit;
   an instance of a data type having a data structure stored in the transient computer readable medium, the data structure having a transient value data field for storing an internalized data format representation of a persistent data associated with the instance and a persistent value data field for storing an externalized data format representation of the persistent data associated with the instance, wherein the internalized data format is a, format that is arranged for use with data operators provided by the computer system during a life cycle of the instance and wherein the externalized data format is a format that is arranged for surviving the life cycle of the instance the internalized and externalized data format representations of the persistent data are permitted to be different representations of the same persistent data;
   a database having a transient portion resident on the transient computer readable medium and a persistent portion resident on the persistent computer readable medium; and
   a persistent storage manager implemented on the computer systems the persistent storage manager operative to manage the database such that the persistent data associated with the instance is maintained within the database.

11. A computer system as recited in claim 10 wherein the database and the persistent storage manager comprise an object oriented database and the data type of the instance is foreign to the object oriented database.

12. A computer system as recited in claim 10 wherein the database and the persistent storage manager comprise a relational database and the data type of the instance is foreign to the object oriented database.

13. A computer system as recited in claim 10 wherein the transient computer readable medium includes random access memory.

14. A computer system as recited in claim 12 wherein the transient computer readable medium includes a portion of a mass storage device set aside as a virtual memory.

15. A computer system as recited in claim 10 wherein the persistent computer readable medium includes a mass storage device.

16. A computer system as recited in claim 10 wherein the instance is contained in a persistent programming language object.

17. A computer system as recited in claim 10 wherein the instance is contained in a distributed object.

18. A distributed object operating environment comprising a plurality of computer systems as recited in claim 17 interconnected by a computer network.

19. A computer System for creating a persistent programming language object having transparent persistent data support, the computer system comprising:
   an object oriented schema tool to compile object oriented schema including a stored form of a foreign data type into a data object class;
   an object oriented compiler to compile an object oriented program together with the data object class into a linkable product;
   an object oriented linker to link the linkable product together with standard object oriented libraries and together with transparent persistence libraries into an object oriented binary file including an instance of the foreign data type, the instance including a data structure stored in a transient computer readable medium, the data structure having a transient value data field for storing an internalized data format representation of a persistent data associated with the instance and a persistent value data field for storing an externalized data format representation of the persistent data associated with the instance, wherein the internalized data format is a format that is arranged for use with data operators provided by the computer system during a life cycle of the instance and wherein the externalized data format is a format that is arranged for surviving the life cycle of the instance, the internalized and externalized data format representations of the persistent data are permitted to be different representations of the same persistent data:
   an object oriented database for maintaining data persistently, the foreign data type being unknown to the object oriented database; and
   a transparent persistence mechanism enabling the instance of the foreign data type to be maintained on the object oriented database.

20. A computer implemented method for creating a persistent instance of a foreign data type capable of receiving transparent persistent data support, the method comprising the step of providing a data structure having a transient value data field for storing an internalized data format representation of a persistent data associated with the instance and a persistent value data field, for storing an externalized data format representation of the persistent data associated with the instance, wherein the internalized data format is a format that is arranged for use with data operators provided by a computer system during a life cycle of the instance and wherein the externalized data format is a format that is arranged for surviving the life cycle of the instance. the internalized and externalized data format representations of the persistent data are permitted to be different representations of the same persistent data.

21. A computer implemented method as recited in claim 20 further including the steps of:
   storing an internalized null value in the transient data field; and
   storing an externalized null value in the persistent data field.

22. A computer implemented insertion method for providing transparent persistent data support to instances of any data type, the method comprising the computer controlled steps of:
   (a) creating a given instance of a foreign data type including providing a data structure having a transient value data field for storing an internalized data format representation of a persistent data associated with the instance and a persistent value data field for storing an externalized data format representation of the persistent data associated with the instance, wherein the internalized data format is a format that is arranged for use with data operators provided by the computer system during a life cycle of the instance and wherein the externalized data format is a format that is arranged for surviving the life cycle of the instance, the internalized and externalized data format representations of the persistent data are permitted to he different representations of the same persistent data;

(b) receiving a new value to be inserted into the persistent data associated with the given instance;

(c) assigning the new value to the transient value data field; and (d) adding an instance identifier associated with the given instance to a change list, the change list capable of representing one or more instances which have data intended for a persistent storage medium present in their corresponding transient value data field.

23. A computer implemented method as recited in claim 22 further including the following computer controlled steps performed after execution of step (c) but prior to execution of step (d):

determining whether the transient value data field does not contain a null value, and, if it does not, deleting a current transient value in the transient value data field and freeing a portion of a computer readable medium which corresponds to the transient value data field; and determining whether the persistent value data field does not contain a null value, and, if it does not, deleting a current persistent value in the persistent value data field and freeing a portion of the computer readable medium which corresponds to the persistent value data field.

24. A computer implemented method as recited in claim 22 wherein the change list is a linked list which has an associated mutual exclusion lock and the step (d) includes the following substeps of:

locking the mutual exclusion lock associated with the change list thereby preventing separate entities from accessing the change list;

appending the instance identifier to the change list; and unlocking the mutual exclusion lock associated with the change list thereby releasing the change list to be accessed by the separate entities.

25. A computer implemented extraction method for providing transparent persistent data support to instances of any data type, the method comprising the computer controlled steps of:

(a) creating a given instance of a data type including a data structure having a transient value data field for storing an internalized data format representation of a persistent data associated with the given instance and a persistent value data field for storing an externalized data format representation of the persistent data associated with the given instance, wherein the internalized, data format is a format that is arranged for use with data operators provided by a computer system during a life cycle of the instance and wherein the externalized data format is a format that is arranged for surviving the life cycle of the instance, the internalized and externalized data format representations of the persistent data are permitted to be different representations of the same persistent data, (b) receiving a request to perform an extraction operation operable to extract the persistent data associated with the given instance from the given instance; and (c) determining whether the transient value data field does not contain a null value, and, if it does not, returning a value stored in the transient value data field as a result of the requested extraction operation.

26. A method as recited in claim 25 wherein when the transient value data field does contain the null value, the method further comprises the computer controlled steps of:

(d) internalizing a value stored in the persistent value data field;

(e) assigning the internalized value to the transient value data field; and (f) returning the internalized value as the result of the requested extraction operation.

27. A computer implemented deletion method for providing transparent persistent data support to instances of any data type, the method comprising the computer controlled steps of;

(a) creating a given instance of a data type including a data structure having a transient value data field for storing an internalized data format representation of a persistent data associated with the given instance and a persistent value data field for storing an externalized data format representation of the persistent data associated with the given instance, wherein the internalized data format is a format that is arranged for use with data operators provided by a computer system during a life cycle of the instance and wherein the externalized data format is a format that is arranged for surviving the life cycle of the instance, the internalized and externalized data format representations, of the persistent data are permitted to be different representations of the same persistent data;

(b) receiving a request to perform an instance deletion operation operable to delete the given instance, (c) determining whether the transient value data field does not contain an internalized null value, and, if it does not, deleting a current transient value in the transient value data field and freeing a portion of a computer readable medium which corresponds to the transient value data field; and (d) determining whether the persistent value data field does not contain an externalized null value, and, if it does not, deleting a current persistent value in the persistent value data field and freeing a portion of the computer readable medium which corresponds to the persistent value data field.

28. A computer implemented deletion method as recited in claim 27 further comprising the computer controlled step of (e) removing any instance identifiers which identify the given instance from a change list, the change list capable of representing one or more instances which have data intended for a persistent storage medium present in their corresponding transient value data field.

29. A computer implemented deletion method as recited in claim 28 wherein the change list is a linked list which has an associated mutual exclusion lock and the step (e) includes the following substeps:

locking the mutual exclusion lock associated with the change list thereby preventing separate entities from accessing the change list;

deleting any instance identifiers which identify the given instance from the change list while concurrently reconnecting the linked list; and unlocking the mutual exclusion lock associated with the change list thereby releasing the change list to be accessed by the separate entities.

30. A computer implemented method as recited in claim 27 further including the step of (f) calling a database manager to delete the given instance from a database managed by the database manager.

31. A computer implemented data commit method for providing transparent persistent data support to instances of any data type, the method comprising the computer controlled steps of:

(a) creating a given instance of a data type including a data structure having a transient value data field for storing an internalized data format representation of a persistent data associated with the given instance and a persistent value data field for storing an externalized data format representation of the persistent data associated with the given instance, wherein the internalized data format is a format that is arranged for use with data operators provided by a computer system during a life cycle of the instance and wherein the externalized data, format is a format that is arranged for surviving the life cycle of the instance, the internalized and externalized data format representations of the persistent data are permitted to be different representations of the same persistent data;

(b) determining whether there are more elements in a change list which need to be committed to a database, the change list capable of representing one or more instances which have data in their corresponding transient value data field intended for the database;

(c) if there are more elements in the change list which need to be committed to the database, selecting a next element from the change list;

(d) determining whether a transient value data field associated with the selected next element does not contain a null value, and, if it does not, externalizing a current value stored in the transient value data field associated with the selected next element and assigning the externalized value to a persistent value data field associated with the selected next element;

(e) writing the externalized value associated with the selected next element into the database; and (f) repeating steps b–e until there are no further elements in the change list which need to be committed to the database.

32. A computer implemented data commit method as recited in claim 31 wherein a cache portion of the database is stored in transient computer readable medium and a persistent portion of the database is stored in a persistent computer readable medium and wherein the writing step (e) is operable to write the externalized value associated with the selected next element into the cache portion of the database.

33. A computer implemented data commit method as recited in claim 32 further comprising the computer controlled step of calling a database commit routine operable to commit data from the cache portion of the database into the persistent portion of the database.

34. A computer implemented data commit method as recited in 31 further comprising the step of deleting the change list after performing step (d).

* * * * *